No. 679,159. Patented July 23, 1901.
W. C. PERKINS.
GAS JET CAGE.
(Application filed Mar. 5, 1901.)
(No Model.)
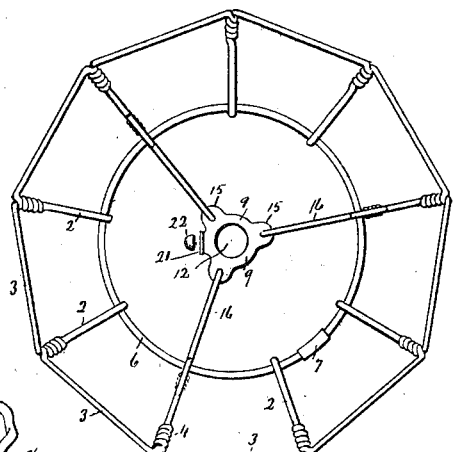
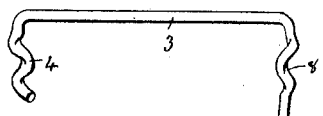
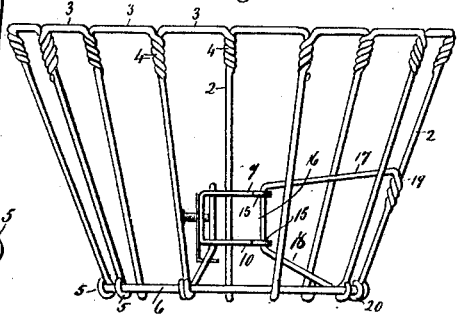
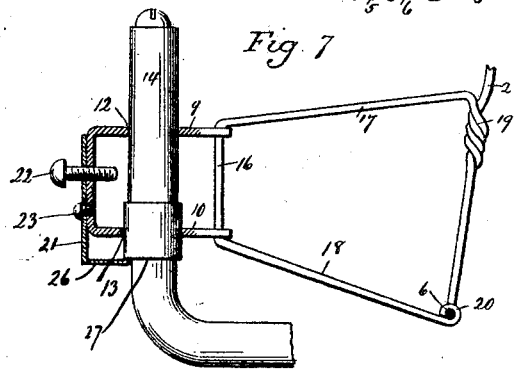
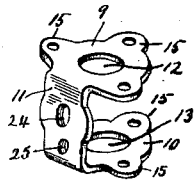
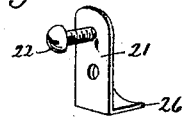
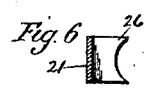

UNITED STATES PATENT OFFICE.

WILLIAM C. PERKINS, OF NEW HAVEN, CONNECTICUT.

GAS-JET CAGE.

SPECIFICATION forming part of Letters Patent No. 679,159, dated July 23, 1901.

Application filed March 5, 1901. Serial No. 49,910. (No model.)

*To all whom it may concern:*

Be it known that I, WILLIAM C. PERKINS, of New Haven, in the county of New Haven and State of Connecticut, have invented a new Improvement in Gas-Jet Cages; and I do hereby declare the following, when taken in connection with the accompanying drawings and the numerals of reference marked thereon, to be a full, clear, and exact description of the same, and which said drawings constitute part of this specification, and represent, in—

Figure 1, a plan view of one form which a gas-jet cage constructed in accordance with my invention may assume; Fig. 2, a view thereof in side elevation; Fig. 3, a detached view of one of the sections; Fig. 4, a detached perspective view of the bracket; Fig. 5, a detached perspective view of the coupling-plate of the bracket; Fig. 6, a detached view, partly in plan and partly in section, of the coupling-plate of the bracket, showing the lower end thereof; Fig. 7, a broken view showing the application of the cage to a gas-burner, with particular reference to the use of the coupling-plate.

My invention relates to an improvement in wire gas-jet cages, the object being to produce at a low cost for manufacture a strong, attractive, durable, and convenient guard for use on gas-jets as a protection against fire.

With this end in view my invention consists in a sectional gas-jet cage having certain details of construction and combinations of parts, as will be hereinafter described, and pointed out in the claims.

In carrying out my invention as herein shown I form the body of the cage from a series of body-sections, each comprising an upright leg 2, a horizontal arm 3, and a relatively short coupling end 4, which is turned downwardly from one end of the horizontal arm, the other end of which merges into the upper end of the upright leg, which stands at an angle of something less than ninety degrees to the horizontal arm. Each of the said body-sections is formed, as shown, from a single piece of wire. The legs 2 of all the sections are formed at their lower ends with eyes 5 for the reception of a wire hoop 6, the ends of which are inserted into a ferrule 7. The coupling ends 4 of the respective sections are twisted around the upper ends of the legs of the sections lying adjacent to them, and so on, the upper ends of the said legs being in this way twisted as well as the coupling ends, as shown at 8 in Fig. 3. A polygonal structure of great strength is thus secured.

Within the body of the cage and just below the center thereof I locate a heavy sheet-metal bracket formed from a single piece of sheet metal and comprising an upper plate 9, a lower plate 10, and a connecting-strip 11, the plates 9 and 10 being formed with circular openings 12 and 13, of which the latter is slightly larger than the former to correspond to the tapering form of an ordinary gas-burner 14. Each of these plates is formed with perforated lugs 15 for the reception of the vertical arm 16 of three radially-arranged wire frames, also comprising arms 17 and 18, slightly diverging from each other, the arms 17 being formed with coupling ends 19, which are twisted around the legs 2 of the body-sections, and the arms 18 being formed with eyes 20, through which the hoop 6 is passed. These frames act not only to support the bracket, but also to stiffen the entire cage structure.

For the purpose of positively connecting the cage to a lamp-burner I provide the bracket with a coupling-plate 21, furnished with screws 22 and 23, respectively entering threaded openings 24 and 25, formed in the connecting-strip 11 of the bracket. By turning the screw 22 inward until it impinges against the burner 14 the cage may be secured to the burner without capacity for rotation; but by turning the screw 22 back and temporarily loosening the screw 23, so as to permit the inwardly-turned edge 26 of the plate 21 to be snapped under the collar 27 of the burner, then the cage will be secured to the burner so that it cannot be lifted off, but so that it may be rotated. After the plate 21 has had its edge 26 snapped under the collar 27 of the burner the screw 23 will be tightened again.

Of course the number of sections entering into the construction of my improved cage and the particular construction of the bracket and the frames for supporting the same may be varied. If desired, the reaches 3 of the body-sections may be bowed, so that the general form of the cage will be round instead of polygonal. I would therefore have it understood that I do not limit myself to the form shown, but hold myself at liberty to make such changes and alterations as fairly fall within the spirit and scope of my invention.

Having fully described my invention, what I claim as new, and desire to secure by Letters Patent, is—

1. A gas-jet cage having its body composed of a plurality of wire body-sections, each made from a single piece of wire, and each consisting of an upright leg, a horizontal arm, and a coupling end turned downwardly from one end of the said arm, the other end of which merges into the upper end of the said leg, the coupling ends of the said sections being twisted around the upper ends of the legs of the adjacent body-sections, and the lower ends of the legs of the sections being connected together.

2. A gas-jet cage having its body composed of a plurality of wire body-sections, each formed from a single piece of wire, and each comprising an upright leg having an eye at its lower end, a horizontal arm merging at one end into the upper end of the said leg, and a coupling end turned downwardly from the other end of the said arm, and the coupling ends of the several sections being twisted around the upper ends of the adjacent sections, and a hoop passing through the eyes at the lower ends of the upright legs of the respective sections.

3. In a gas-jet cage, the combination with a plurality of wire body-sections each comprising an upright leg, a horizontal arm and a depending coupling end, the coupling ends of the said sections being twisted around the upper ends of the adjacent body-sections, of means for uniting the lower ends of the legs of the said body-sections, a sheet-metal bracket comprising an upper and a lower plate and a connecting-strip between the same, and radially-arranged wire frames connected at their inner ends with the upper and lower plates of the said bracket, and connected at their outer ends with the said legs and with the said means.

4. In a gas-jet cage, the combination with a plurality of wire body-sections each of which has an upright leg, a horizontal arm and a depending coupling end, the coupling ends of the said sections being twisted around the upper ends of the adjacent body-sections, of means for uniting the lower ends of the said legs, a sheet-metal bracket, and radially-arranged wire frames each consisting of a vertical leg passing through the bracket and an upper and a lower arm, the upper arm of each frame being connected with a leg of one of the said body-sections, and the lower arm of each frame being connected with the said means.

5. In a gas-jet cage, the combination with the body thereof, of a sheet-metal bracket located in the center of the cage and comprising an upper and a lower plate and a connecting-strip between the same, means connected with the said body-sections for supporting the said bracket centrally within the cage, and a coupling-plate applied to the said connecting-strip of the bracket and coacting with a supporting gas-pipe for securing the cage thereto with a capacity for rotation thereon.

6. In a gas-jet cage, the combination with a plurality of wire body-sections each consisting of an upright leg, a horizontal arm merging at one end into the upper end of the said leg, and a coupling end depending from the other end of the said arm, the coupling ends of the said sections being twisted around the upper ends of the upright legs of adjacent sections; of a hoop connecting the lower ends of the said legs, a sheet-metal bracket formed from a single piece of sheet metal and comprising an upper and lower plate, each having a central perforation, and also comprising a strip connecting the said plates, and a plurality of radially-arranged wire frames, each having a vertical arm passing through the upper and lower plates of the said bracket, and each having an upper and a lower arm, the upper arms of the said frames being connected at their outer ends with the upright legs of the body-section and the lower arms of the said frames being connected with the said hoop.

In testimony whereof I have signed this specification in the presence of two subscribing witnesses.

WILLIAM C. PERKINS.

Witnesses:
DANIEL H. VEADER,
C. E. CLARK.